INVENTOR.
LAWRENCE J. GUIDO
BY
Samuel Kane
ATTORNEY

3,302,484
ACTUATING MECHANISM FOR MULTIPLE POSITION DEVICES
Lawrence J. Guido, Paoli, Pa., assignor to Burroughs Corporation, Detroit, Mich., a corporation of Michigan
Filed Nov. 18, 1964, Ser. No. 412,189
15 Claims. (Cl. 74—625)

This invention relates generally to actuating mechanisms and more particularly to mechanisms of this general character for actuating multiple position devices. While not limited thereto, the invention finds special application in miniature form for actuating a multiple position electrical switch.

An object of the invention is the provision of an actuating mechanism which will afford accurate indexing of multiple position devices.

Another object of the invention is to provide an actuating mechanism whose operation is substantially shock free.

A further object of the invention is the provision of an actuating mechanism which may be operated manually or by means of power.

Another object of the invention is the provision of an actuating mechanism which provides a constantly varying speed of its output member.

A further object of the invention is the provision of an actuating mechanism for indexing multiple position devices and which affords maximum speed of operation between index positions.

Still a further object of the invention is the provision of an actuating mechanism for indexing multiple position devices and which has a maximum load capacity at the start and stop positions of each indexing movement.

Another object of the invention is the provision of an actuating mechanism having separate manual and power input devices with means enabling one of the input devices to positively override the other input device.

Another object of the invention is the provision of such an actuating mechanism in which the manual input will show the true position of the output.

Still another object of the invention is the provision of a clutch mechanism which affords both a slippable drive and accurate orientation of the clutch mating parts.

Another object of the invention is the provision of an actuating mechanism which assures a minimum speed of operation of its output member regardless of input speeds.

A further object of the invention is the provision of a manually operable actuating mechanism with means for preventing the operator from manipulating it in an incorrect manner.

Still a further object of the invention is the provision of an actuating mechanism for indexing multiple position devices and which incorporates a locking means for securing it in different index positions.

Another more specific object of the invention is the provision of a manually operable actuating mechanism for indexing a multiple position electrical switch and which is provided with means for preventing the operator from holding the switch contacts in an intermediate position, thereby preventing arcing or other faulty operation of the switch.

Still another object of the invention is the provision of an actuating mechanism which is capable of providing translational as well as rotary outputs.

In accordance with the above objects, and considered first in its broader aspects, the invention may comprise a rotatable member, means for stepping the rotatable member angularly, an operating shaft, and means including a first resilient element resiliently coupling the operating shaft to the stepping means. The first resilient element is adapted to be stressed by movement of the operating shaft to such an extent that when released it will actuate the stepping means independently of the operating shaft. There is also provided means including a second resilient element which cooperates with initial movement of the operating shaft for stressing the first resilient element to the extent mentioned and which is responsive to further movement of the operating shaft for releasing the first resilient element.

The invention will be more clearly understood when the following detailed description of the preferred embodiment thereof is read in conjunction with the accompanying drawings in which.

Figure 1:
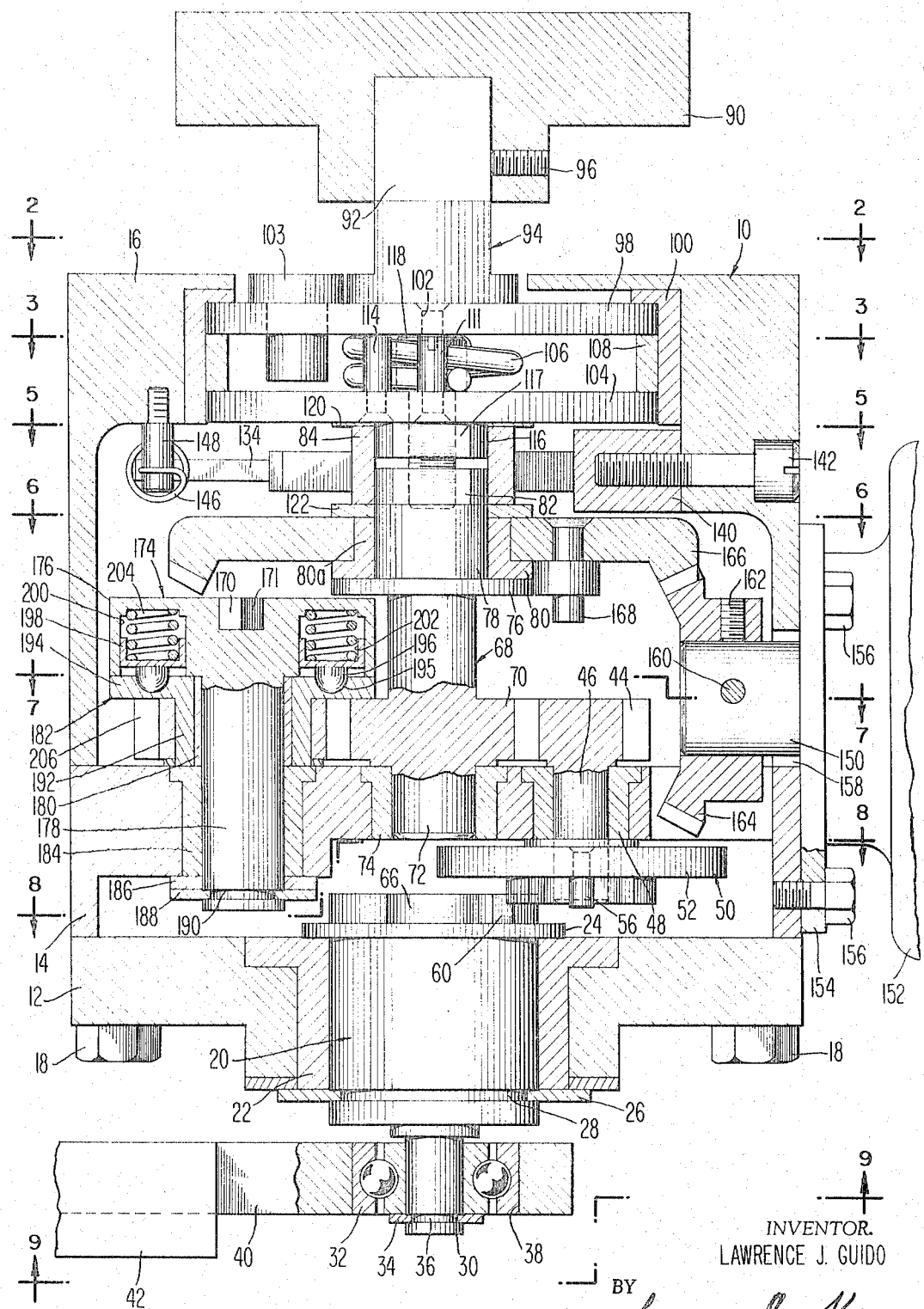
FIG. 1 is an elevational view partially in section of an actuating mechanism constructed in accordance with the invention.

Turning now to the detailed description of the illustrated embodiment of the invention, and first with reference to FIG. 1 of the drawings, the invention is supported in a suitable housing 10 which conveniently may consist of a lower section 12, a medial section 14 and an upper section 16. The several sections of the housing 10 may be secured together in any suitable manner, as by means of screws 18.

The output of the invention is driven by an intermittent motion mechanism which, in this embodiment, includes a Geneva shaft 20 rotatably mounted in a bearing 22 secured in the lower section 12 of the housing 10. The Geneva shaft 20 is provided with a shoulder 24 at its upper end for locating it axially in the housing 10. The Geneva shaft 20 is secured in its axial position by means of a retaining ring 26 which is locked in an annular recess 28 in the Geneva shaft 20.

The lower end of the Geneva shaft 20 is formed as an eccentric shaft portion 30 (see also FIGS. 8 and 9) on which is mounted a ball bearing 32. The ball bearing is retained axially on the eccentric shaft portion 30 by means of a retaining ring 34 locked in an annular recess 36 in the eccentric shaft portion 30. The ball bearing 32 is positioned freely in an elongate slot 38 in a contact slide member 40 which is guided for linear movement in a fixed yoke 42 of an associated multiple position device such as an electrical switch, not shown. It is assumed for purposes of illustration that the associated electrical switch has electrical contacts in three positions and that appropriate movement of the contact slide 40 is effective to close the contacts in any selected one of these positions. Actuation of the mechanism in a manner to be described later will therefore serve to move the contact slide 40 to one of the other two contact positions from the zero contact position in which it is illustrated.

Figure 7:
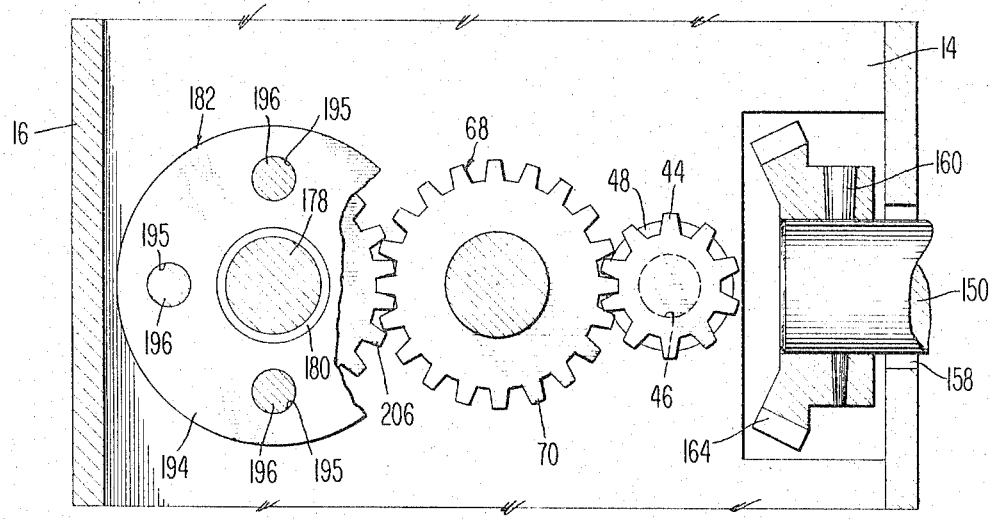
FIG. 7 is a sectional view with part broken away, taken along line 7—7 of FIG. 1.

A gear 44 (FIGS. 1 and 7) is formed integrally with a depending shaft portion 46 which is rotatably mounted in a bearing 48 fixed in the medial section 14 of the housing 10. The lower end of the shaft portion 46 is inserted into the axial bore 49 (FIG. 8) of a Geneva driver 50 (FIGS. 1 and 8) and may be press-fitted in or otherwise secured to the Geneva driver 50 for rotation therewith.

Figure 8:
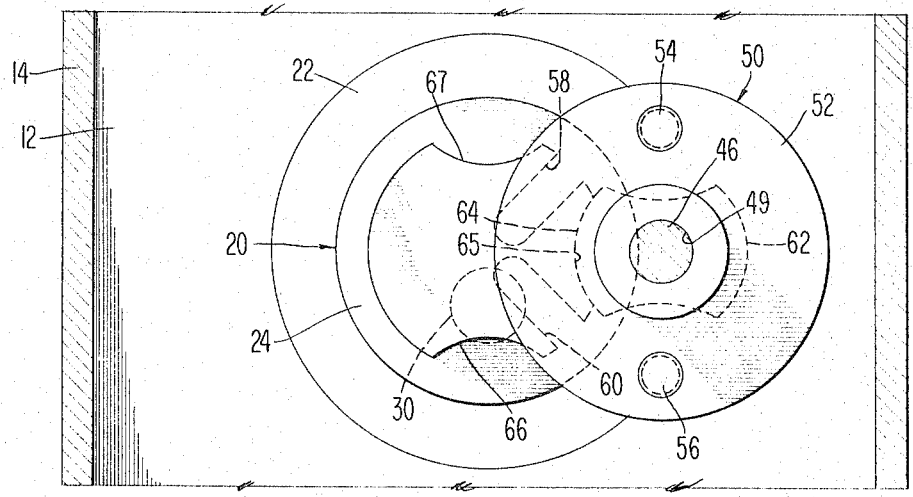
FIG. 8 is a sectional view taken along line 8—8 of FIG. 1 and showing an intermittent motion Geneva mechanism for stepping an associated multiple position device; and, FIG. 9 is a fragmentary bottom view taken along line 9—9 of FIG. 1 and showing the coupling between the actuating mechanism and the multiple position device.
Figure 9:
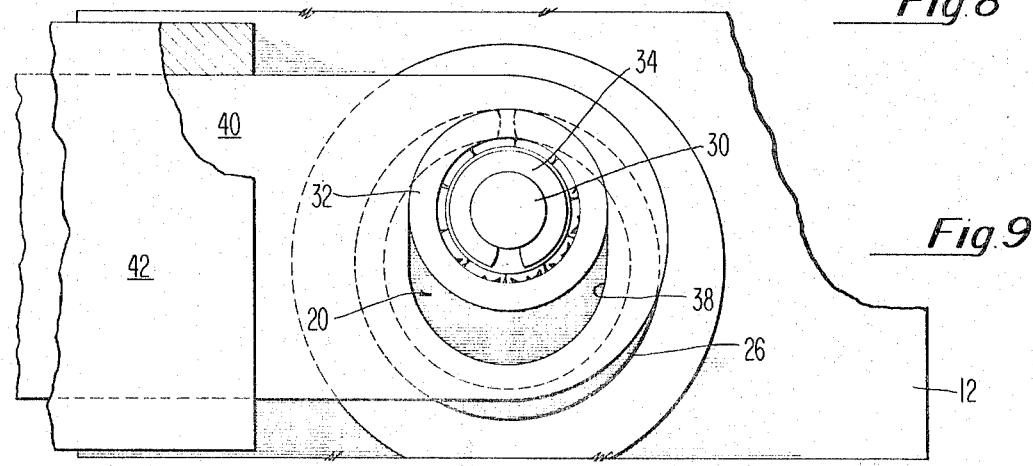

The Geneva driver 50 is formed with an enlarged disc portion 52 in which are secured two depending Geneva driver pins 54 and 56 (FIG. 8), each adapted for engaging one of the Geneva slots 58 or 60, respectively, in the upper end of the Geneva shaft 20. The lower end of the Geneva driver 50 is also provided with two locking surfaces 62 and 64 each of which is adapted to mate with one of three locking surfaces 65, 66 and 67 on the Geneva shaft 20. As shown in FIG. 8, locking surface 64 is mating with locking surface 65 and thus locks the Geneva shaft 20 against rotation.

Figure 5:
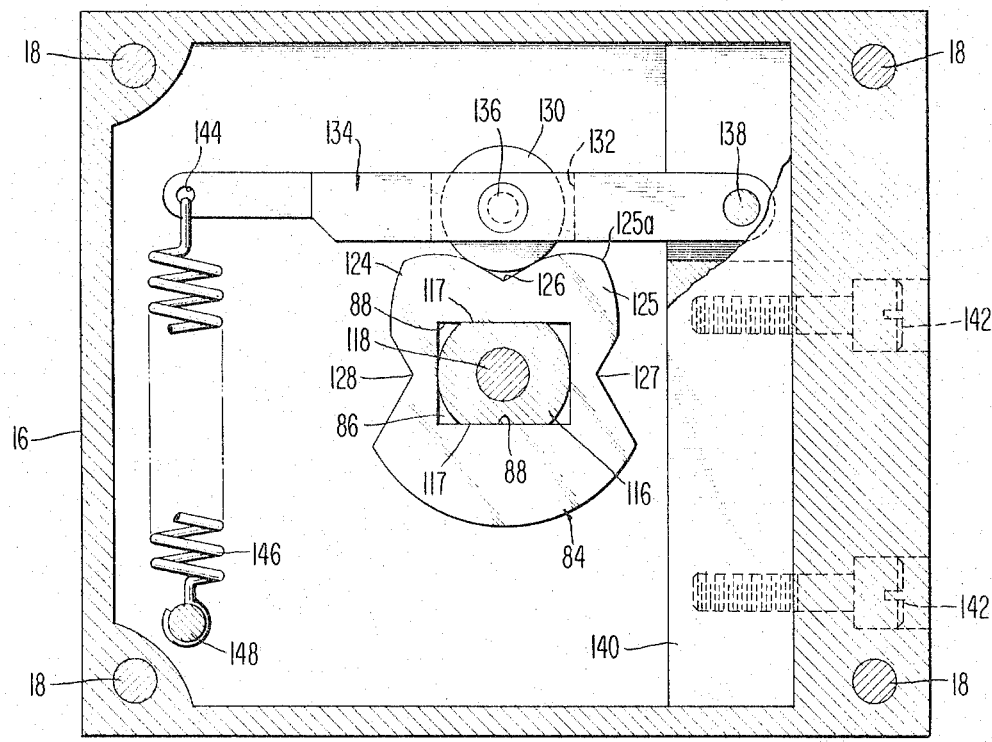
FIG. 5 is a sectional view with part broken away, taken along line 5—5 of FIG. 1, and illustrating a detenting mechanism.

A gear shaft 68 (FIG. 1) has integrally formed therewith a gear 70 which is in mesh with the gear 44, and a shank portion 72 at its lower end rotatably mounted in a bearing 74 secured in the medial section 14 of the housing 10. Adjacent its upper end, the gear shaft 68 is provided with a shoulder 76 and an end shank portion 78 on which is secured a flanged bearing 80. The upper end of the shank portion 78 is formed with two diametrically opposite flats 82, only one of which is shown in FIG. 1, and fits into the lower end of a detent 84 (see also FIG. 5) having a rectangular opening 86 with two of its side surfaces 88 mating with the flats 82.

Figure 3:
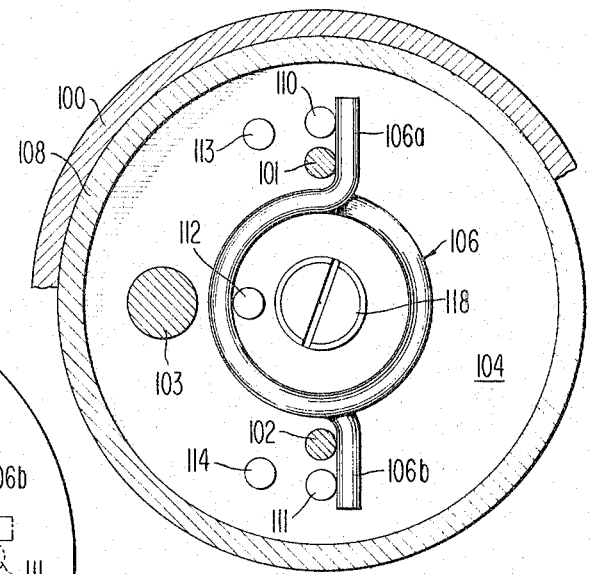
FIG. 3 is a fragmentary sectional view with parts omitted, taken along line 3—3 of FIG. 1.

Manual input to the actuating mechanism is provided by means of a hand grip 90 (FIG. 1) secured on the squared end 92 of an operating shaft 94, as by means of a set screw 96. The lower end of the operating shaft 94 is in the form of an enlarged disc 98 rotatably mounted in a flanged bearing 100 secured in the upper section 16 of the housing 10. Two depending driving pins 101 and 102 (FIG. 3) and a depending stop pin 103 are inserted into suitable openings in the disc 98 and secured to the disc in any suitable manner as by press-fitting or riveting.

Motion is transmitted from the operating shaft 94 to a lower disc 104 (FIGS. 1 and 3) through the medium of a helically-wound torsion spring 106 and certain pins, as will be described. The lower disc 104 is rotatably mounted in the flanged bearing 100 and is positioned at a suitable distance from the operating shaft disc 98 by an annular spacer 108.

The lower disc 104 has secured therein two upwardly extending driven pins 110 and 111 (FIG. 3), an upwardly extending spring-locating pin 112, and two upwardly extending auxiliary pins 113 and 114. The lower disc 104 is formed integrally with a short depending shank 116 (FIG. 1) which is fitted into the upper end of the detent 84 and is provided with diametrically opposite flats 117, similar to the flats 82, which similarly serve to lock the shank 116 in the rectangular opening 86 of the detent 84. A headed screw 118 (see also FIG. 3) extends through an axial opening in the lower disc 104 and its shank portion 116, and is tightly threaded into a tapped hole in the upper end 78 of the gear shaft 68. The screw 118 thus locks together as a unitary assembly the lower disc 104, a spacing shim 120, the detent 84, a spacer 122, the flanged bearing 80, and the gear shaft 68.

The torsion spring 106 (FIG. 3) is positioned with its inside diameter over the head of the screw 118 and over the spring-locating pin 112 and with its ends 106a and 106b abutting side surfaces of the pins 101 and 110 and 102 and 111, respectively. As so positioned, the torsion spring 106 is slightly stressed or loaded in the winding direction, and thus serves to urge the operating shaft 94 to a centralized position.

The detent 84 (FIG. 5) is formed with two cam lobes 124 and 125, and three susbtantially V-shaped detent grooves 126, 127 and 128, each of the grooves corresponding to one position of the multiple position switch contact slide 40. A detent roller 130 is freely positioned in a slot 132 of a lever arm 134 and rotatably mounted on a pin 136 which is secured in the lever arm 134. The lever arm 134 is pivotally mounted at one end on a pin 138 fixed to a lever arm retaining member 140 which is secured to the upper section 16 of the housing 10, as by means of screws 142. The other end of the lever arm 134 is provided with an aperture 144 in which is anchored one end of a tension spring 146, the other end of which is anchored to a pin 148 threadedly secured in the upper section 16 of the housing. The spring 146 is under tension and thus serves to detent the actuating mechanism in the various positions.

Power input to the actuating mechanism may be provided by any suitable power-operated rotatable means such as the shaft 150 (FIG. 1) of an electric motor 152 having a flanged portion 154 secured to the housing 10, as by screws 156. The shaft 150 projects into the interior of the housing 10 through an opening 158 in the upper section 16 and has secured thereon, by means of a tapered pin 160 (FIG. 7) and a set screw 162 (FIG. 1), a bevel gear 164 which is in mesh with a larger bevel gear 166, the latter being freely captured between the flange of the bearing 80 and the spacer 122 and rotatably mounted on the upper cylindrical portion 80a of the spacer 80. The bevel gear 166 is therefore rotatably movable relative to the gear shaft 68.

Figure 6:
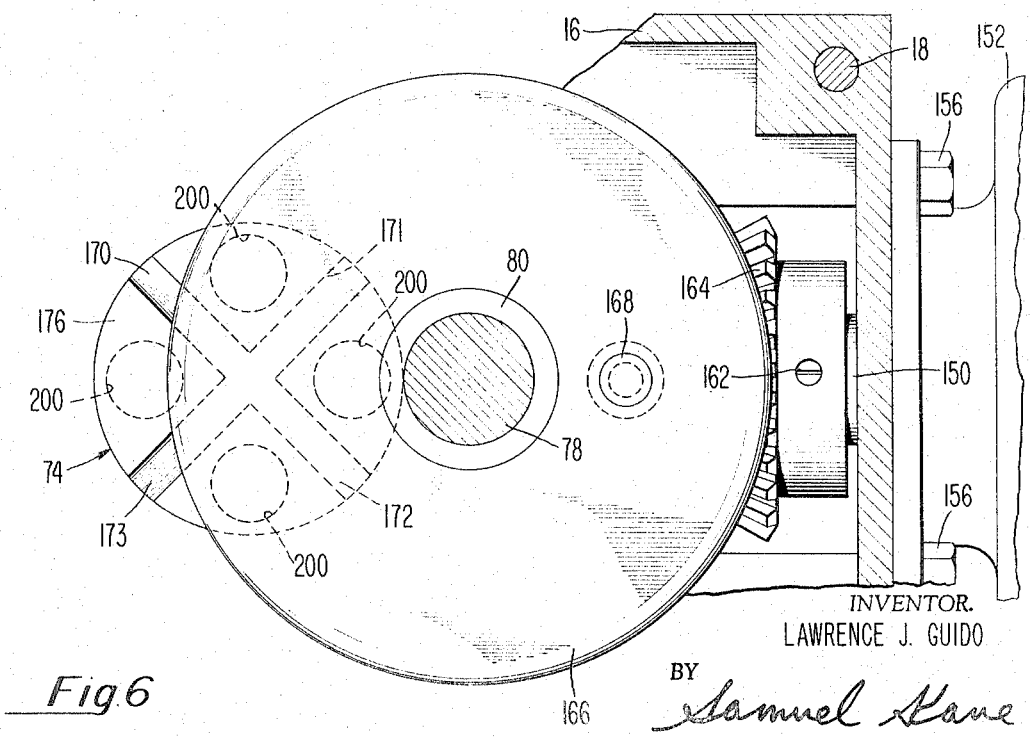
FIG. 6 is a sectional view with parts broken away, taken along line 6—6 of FIG. 1, and showing an intermittent motion Geneva mechanism for power operation of the actuating mechanism.

The bevel gear 166 has secured therein a depending intermittent motion Geneva driver pin 168 adapted to engage in one of four radial slots 170, 171, 172 and 173 (FIG. 6) in the upper surface of a Geneva clutch shaft 174. The Geneva clutch shaft 174 (FIG. 1) is provided with an enlarged head portion 176 which is formed integrally with a depending shank portion 178 rotatably mounted in a bushing 180 press-fitted or otherwise secured in the axial bore of a clutch disc member 182. The lower end of the shank portion 178 is also rotatably mounted in a bearing 184 secured in the medial section 14 of the housing 10. The Geneva clutch shaft 174 is retained axially in its position by means of a spacer 186 and a retaining ring 188 which is locked in an annular recess 190 in the lower end of the shank portion 178.

The clutch disc member 182 is formed with a cylindrical body portion 192 and an upper flange or disc portion 194. In the upper face of the flanges 194 are four depressions 195 (see also FIG. 7) whose surfaces are spherical and in which are positioned mating semi-spherical depending shaft portions 196 of plungers 198 (FIG. 1) slidably positioned in bores 200 which extend upwardly into the lower face of the enlarged head portion 176 of the clutch shaft 174.

Each plunger 198 is provided with an axial bore 202 extending downwardly from its upper end and in which is positioned one end of a compression spring 204, the other end of which presses against the flat end of the particular bore 200.

Secured on the cylindrical body portion 192 of the clutch disc member 182 for rotation therewith is a gear 206 which is in mesh with the gear 70. The ratio of the gear teeth between gears 206 and 70 is 1:1, and the ratio of the gear teeth between gears 70 and 44 is 2:1.

The actuating mechanism is operated manually by turning the hand grip 90 is either direction, depending upon the direction in which it is desired to move the contact slide 40 past the illustrated zero, or central, position. Since the actuating mechanism operates in a similar manner whether the hand grip 90 is turned in one direction or the other, the manual operation will be described for purposes of illustration, only in conjunction with counterclockwise operation of the hand grip 90, or operating shaft 94, as viewed in FIG. 2. As may be perceived from FIG. 2, surfaces 208 and 210 on the upper section 16 of the housing 10 will limit motion of the operating shaft 94 in either direction since the head of the stop pin 103 will come against either of these surfaces whenever the operating shaft 94 is rotated 90 degrees in either direction.

Figure 2:
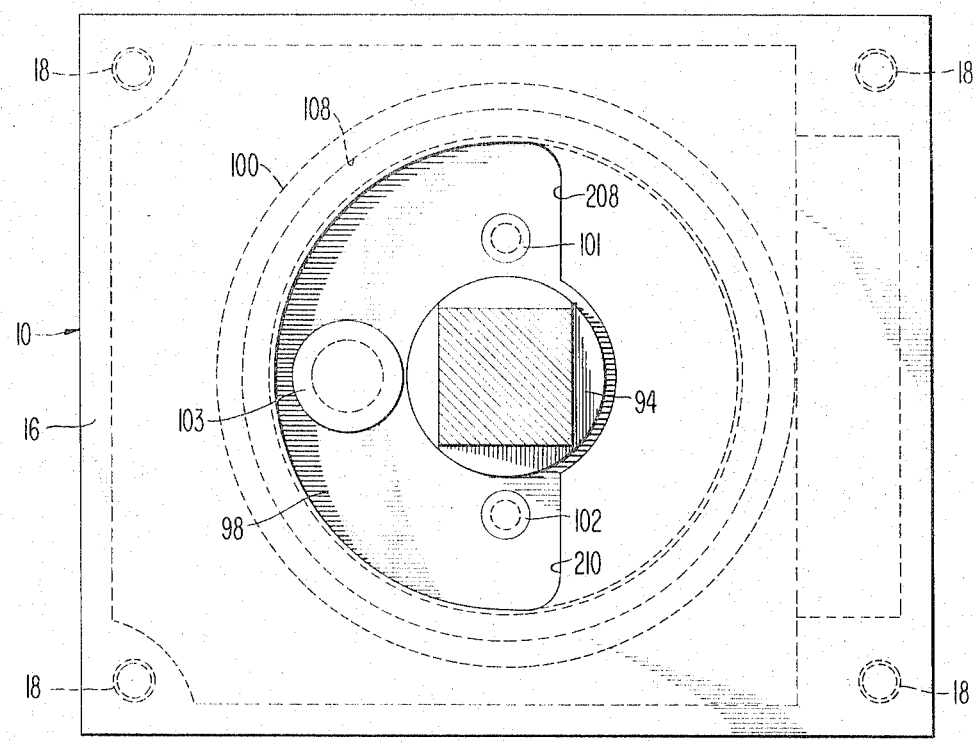
FIG. 2 is a sectional view taken along line 2—2 of FIG. 1.
Figure 4:
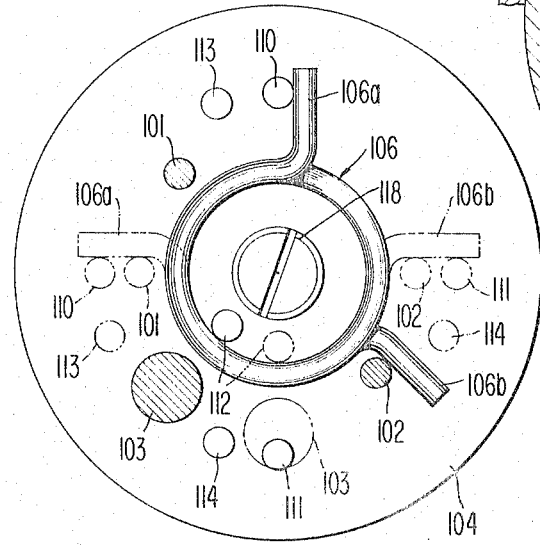
FIG. 4 illustrates an operating position of a torsion spring shown in FIG. 3.

When the hand grip 90, and therefore the operating shaft 94, is turned in a counterclockwise direction, as viewed in FIG. 2, the drive pin 102 will wind the torsion spring 106, as indicated in FIG. 4, causing the end 106a of the torsion spring to press harder against the driven pin 110. The driven pin 110 will initially remain stationary with the lower disc 104 and the gear shaft 68 due to the detent resisting torque effected by the tension spring 146. When the torque applied by the torsion spring 106 to pin 110 matches the detent resisting torque in the gear shaft 68, the gear shaft 68, at an angular lag, will commence following the operating shaft 94 and rotate with it, thereby camming upwardly, as viewed in FIG. 5, the detent roller 130 and further stressing the tension spring 146. Just as the detent roller 130 moves up to a position where it is on the high point 125a of the cam lobe 125, the tension spring 146 will at this point offer substantially no resisting torque. The torsion spring 106 will therefore unwind in a snap-acting manner and rotate the gear shaft 68 ninety degrees through the medium of the pin 110 and disc 104, as indicated by the phantom view of the torsion spring and pins, shown in FIG. 4. The mechanism will also be detented in the new position by the action of the spring 146 in forcing the roller 130 into the detent groove 127.

Through the gears 70 and 44, the 90-degree rotation of the gear shaft 68 will effect a 180-degree rotation of the Geneva driver 50. In this rotation of the Geneva driver 50, the driving pin 54 thereon will interchange positions with the driving pin 56, and in making this excursion it will enter into the slot 58 of the Geneva shaft 20 and index this shaft 90 degrees. At the end of this movement of the Geneva driver 50, the locking surface 64 will be away from the locking surface 65 and the locking surface 62 will be positioned in the mating curvature of the locking surface 67 to thereby lock the Geneva shaft 20 in the new position. The movement of the Geneva shaft 20 will, through its eccentric shaft portion 30 and the ball bearing 32, effect a leftward movement of the contact slide 40, as viewed in FIGS. 1 and 9.

As mentioned above, the torsion spring 106 will commence its snap-acting movement when the detent roller 130 is on the high point 125a of the cam lobe 125. When the high point 125a has moved slightly past the center line of the detent roller 130, the resisting torque in the gear shaft 68 will reverse and become an aiding torque, so that the tension spring 146 will then aid the torsion spring 106 in indexing the mechanism, in addition to rapidly detenting it in the indexed position.

Besides affording a rapid indexing movement of the mechanism, the actions of the torsion spring 106 and the tension spring 146 also serve to prevent the operator from manually holding the Geneva shaft 20 in an intermediate or non-locked position.

In the event that the torsion spring 106 fails or encounters an excessively heavy load in manual operation, or is otherwise ineffective, a positive drive will be transmitted to one of the auxiliary pins 113 or 114, depending upon the direction of rotation, by reason of the lost-motion coupling between these pins and the shank of the stop pin 103. Thus the stop pin 103 will act as a driver against the particular pin 113 or 114 after continued rotation of the hand grip 90 has served to take up the lost motion between these members. In such case, the tension spring 146 will effect both indexing and detenting of the mechanism whenever the high point of the particular cam 124 or 125 will have moved past the center line of the detent roller 130, as described above.

Power operation of the actuating mechanism is accomplished by operating the electric motor 152 to cause rotation of the bevel gear 166 to such a extent that the Geneva driving pin 168 will enter one of the slots 171 or 172, depending upon the direction of rotation, and will thereby index the Geneva clutch shaft 174 through an angle of 90 degrees. This motion will be transmitted to the gear 206 through the clutch disc 182 and thence to the Geneva shaft 20 through the gear 70, gear 44, and Geneva driver 50. Rotation of gear 70 will be accompanied by rotation of the gear shaft 68, actuation of the detent mechanism, and rotation of the operating shaft 94. Thus in power operation, as in manual operation, the mechanism will be detented and the manual input will show the true position of the output.

In the event that the Geneva shaft 20 should encounter a heavy resistance or load, in power operation, due to some fault or sticking of the contact slide 40, or of its associated electrical switch, which would hold stationary the clucth disc 182 and which might otherwise cause damage to the electric motor 152, slipping will occur between the Geneva clutch shaft 174 and the clutch disc 182 by reason of the plungers 198 being cammed upwardly out of the spherical sockets 195 when the Geneva clutch shaft 174 is rotated. Since the Geneva clutch shaft 174 will nevertheless, under such circumstances also, be rotated through 90 degrees by the Geneva driver pin 168, the plungers 198 will again set themselves in the depressions 195 in accurate alignment upon completion of the 90-degree indexing movement. Thus the actuating mechanism incorporates a safety feature which protects the power source against damage and enables the mechanism to reset itself accurately into a new position.

In the event that the bevel gear 166 should inadvertently be overdriven, in power operation, to such an extent that the Geneva driver pin 168 might come to rest in one of the slots 170–173, the mechanism will nevertheless permit subsequent manual operation which will override the power drive. In such case, whenever the operating shaft 94 would be rotated, the clutch disc 182 would be rotated with it through the medium of the gear 70 and the gear 206, and slipping would occur also in this case between the clutch disc 182 and the Geneva clutch shaft 174, the latter being held against rotation by the drive pin 168 being in one of the slots 170–173.

As indicated earlier, the invention finds special, but not limited, application in miniature form for actuating electrical switches. Thus, in a particular application, a miniature actuating mechanism constructed in accordance with the invention was supported in a housing which was approximately 1½ inches in height, 1¼ inches in width, and 1¼ inches in depth.

While there has been shown and described a specific actuating mechanism exemplary of the principles of the invention, it is to be understood that this is but one embodiment thereof, and that the invention is capable of being constructed in a variety of sizes, shapes and modifications without departing from the true spirit and scope thereof. Accordingly, it is to be understood that the invention is not to be limited by the specific structure disclosed but only by the subjoined claims.

What is claimed is:

1. A miniature bidirectional actuating mechanism for a multiple position electrical switch having electrical contacts at each position, said actuating mechanism comprising, a contact slide movable bidirectionally for closing the electrical contacts at selected ones of said positions, a member rotatable for moving said contact slide, means for rotating said member from one position to another in either of two opposite directions to thereby move said contact slide bidirectionally a first operating shaft, means including a spring element resiliently coupling the first operating shaft to the rotating means, said spring element being adapted to be stressed by movement of the first operating shaft to such an extent that when released it will actuate the rotating means independently of the first operating shaft, mechanism for detenting the rotatable member in each said position, said mechanism cooperating with initial movement of the first operating shaft for stressing the spring element to the extent mentioned and being responsive to further movement of the first operating shaft for releasing the spring element, means for releasably locking said rotatable member in each said position, a second operating shaft, an intermittent motion mechanism operably coupled to the second operating shaft, means independent of the first operating shaft yieldably coupling the intermittent motion mechanism to the rotating means, and means providing a lost-motion coupling between the rotating means and the first operating shaft effective only in the event of failure of the spring element.

2. A bidirectional actuating mechanism comprising, a rotatable first intermittent motion mechanism, means for rotating said mechanism from one position to another in either of two opposite directions, a first operating shaft, means including a bidirectionally operable spring means resiliently coupling the first operating shaft to the rotating means, said spring means being adapted to be stressed by movement of the first operating shaft to such an extent that when released it will actuate the rotating means independently of the first operating shaft, mechanism for detenting the rotating means in each said position, said detenting mechanism cooperating with initial movement of the first operating shaft for stressing the spring means to the extent mentioned and being responsive to further movement of the first operating shaft for releasing the spring means, means for releasably locking said first intermittent motion mechanism in each said position, a second operating shaft, a second intermittent motion mechanism operably coupled to the second operating shaft, means independent of the first operating shaft coupling the second intermittent motion mechanism to the rotating means, and means providing a lost-motion coupling between the rotating means and the first operating shaft effective only in the event of failure of the spring means.

3. A bidirectional actuating mechanism comprising, a rotatable member, means for rotating said member from one position to another in either direction, a first operating shaft, means including a resilient element resiliently coupling the first operating shaft to the rotating means, said resilient element being adapted to be stressed by a movement of the first operating shaft to such an extent that when released it will actuate the rotating means independently of the first operating shaft, mechanism for detenting the rotating means in each said position, said mechanism cooperating with initial movement of the first operating shaft for stressing the resilient element to the extent mentioned and being responsive to further movement of the first operating shaft for releasing the resilient element, means for releasably locking said rotatable member in each said position, a second operating shaft, an intermittent motion mechanism operably coupled to the second operating shaft, means independent of the first operating shaft yieldably coupling the intermittent motion mechanism to the rotating means, and means providing a lost-motion coupling between the rotating means and the first operating shaft effective only in the event of failure of the resilient element.

4. An actuating mechanism comprising, a rotatable member, means for rotating said member from one position to another in either direction, a first operating shaft, means including a torsion spring resiliently coupling the first operating shaft to the rotating means, said torsion spring being adapted to be stressed by movement of the first operating shaft to such an extent that when released it will actuate the rotating means independently of the first operating shaft, mechanism for detenting the rotating means in each said position, said mechanism cooperating with initial movement of the first operating shaft for stressing the torsion spring to the extent mentioned and being responsive to further movement of the first operating shaft for releasing the torsion spring, means for releasably locking said rotatable member in each said position, a second operating shaft, a Geneva motion mechanism operably coupled to the second operating shaft, and means independent of the first operating shaft coupling the Geneva motion mechanism to the rotating means.

5. An actuating mechanism comprising, a rotatable member, means for rotating said member from one position to another in either direction, a first operating shaft, means including a resilient element resiliently coupling the first operating shaft to the rotating means, said resilient element being adapted to be stressed by movement of the first operating shaft to such an extent that when released it will actuate the rotating means independently of the first operating shaft, mechanism for detenting the rotatable member in each said position, said mechanism cooperating with initial movement of the first operating shaft for stressing the resilient element to the extent mentioned and being responsive to further movement of the first operating shaft for releasing the resilient element, means for releasably locking said rotatable member in each said position, a second operating shaft, an intermittent motion mechanism operably coupled to the second operation shaft, and means independent of the first operating shaft coupling the intermittent motion mechanism to the rotating means.

6. An actuating mechanism comprising, a rotatable member, means for stepping said member angularly, a first operating shaft, means including a resilient element resiliently coupling the first operating shaft to the stepping means, said resilient element being adapted to be stressed by movement of the first operation shaft to such an extent that when released it will actuate the stepping means independently of the first operating shaft, means cooperating with initial movement of the first operating shaft for so stressing said resilient element and responsive to further movement of the first operating shaft for releasing the resilient element, a second operating shaft, a Geneva motion mechanism operably coupled to the second operating shaft, and means including a slippable clutch independent of the first operating shaft coupling the Geneva motion mechanism to the stepping means.

7. An actuating mechanism comprising, a rotatable member, means for stepping said member angularly, a first operating shaft, means including a resilient element resiliently coupling the first operating shaft to the stepping means, said resilient element being adapted to be stressed by movement of the first operation shaft to such an extent that when released it will actuate the stepping means independently of the first operating shaft, means cooperating with initial movement of the first operating shaft for so stressing said resilient element and responsive to further movement of the first operating shaft for releasing the resilient element, a second operating shaft, a Geneva motion mechanism operably coupled to the second operating shaft, and means independent of the first operating shaft yieldably coupling the Geneva motion mechanism to the stepping means.

8. An actuating mechanism comprising, a rotatable member, means for stepping said member angularly, a first operating shaft, means including a resilient element resiliently coupling the first operating shaft to the stepping means, said resilient element being adapted to be stressed by movement of the first operating shaft to such an extent that when released it will actuate the stepping means independently of the first operating shaft, means cooperating with initial movement of the first opearting shaft for so stressing said resilient element and responsive to further movement of the first operating shaft for releasing the resilient element, a second operating shaft, an intermittent motion mechanism operably coupled to the second operating shaft, and means independent of the first operating shaft coupling the intermittent motion mechanism to the stepping means.

9. An actuating mechanism comprising, a rotatable member, means for stepping said member angularly, a first operating shaft, means including a resilient element resiliently coupling the first operating shaft to the stepping means, said resilient element being adapted to be stressed by movement of the first operating shaft to such an extent that when released it will actuate the stepping means independently of the first operating shaft, means cooperating with initial movement of the first operating shaft for so stressing said resilient element and responsive to further movement of the first operating shaft for releasing the resilient element, a second operating shaft, and means including a slip clutch for yieldably coupling the second operating shaft to the stepping means.

10. An actuating mechanism comprising, a rotatable member, means for stepping said member angularly from one position to at least one other position, a first operating shaft, means coupling the first operating shaft to the stepping means, means including a resilient element for detenting the stepping means when the rotatable member is in each said position, said resilient element being adapted to be stressed by movement of the first operating shaft to such an extent that when released it will actuate the stepping means independently of the first operating shaft, a second operating shaft, and means independent of the first operating shaft for coupling the second operating shaft to the stepping means.

11. A miniature bidirectional actuating mechanism comprising, a rotatable member, means for rotating said member intermittently from one position to another in either direction, means for releasably locking said rotatable member in each said position, an operating shaft, means including a bidirectionally operable spring means resiliently coupling the operating shaft to the rotating means, said spring means being adapted to be stressed by movement of the operating shaft to such an extent that when released it will actuate the rotating means independently of the operating shaft, and means including a resilient element cooperating initial movement of the operating shaft for so stressing said spring means and responsive for further movement of the operating shaft for releasing the spring means.

12. An actuating mechanism comprising, a rotatable member, means for rotating said member intermittently from one position to another in either direction, means for releasably locking said rotatable member in each said position, an operating shaft, means including a first resilient element resiliently coupling the operating shaft to the rotating means, said first resilient element being adapted to be stressed by movement of the operating shaft to such an extent that when released it will actuate the rotating means independently of the operating shaft, and means including a second resilient element cooperating with initial movement of the operating shaft for so stressing said first resilient element and responsive to further movement of the operating shaft for releasing the first resilient element.

13. An actuating mechanism comprising, a rotatable member, means for stepping said member angularly, an operating shaft, means including a torsion spring resiliently coupling the operating shaft to the stepping means, said torsion spring being adapted to be stressed by movement of the operating shaft to such an extent that when released it will actuate the stepping means independently of the operating shaft, means including a resilient element cooperating with initial movement of the operating shaft for so stressing said torsion spring and responsive to further movement of the operating shaft for releasing the torsion spring, and means providing a controlled positive drive between the stepping means and the operating shaft effective in the event of failure of the torsion spring.

14. An actuating mechanism according to claim 13 wherein said controlled positive drive means comprises an auxiliary driving pin carried by said operating shaft and an auxiliary driven pin carried by said stepping means and in the path of movement of and normally spaced from said auxiliary driving pin.

15. An actuating mechanism comprising, a rotatable member, means for rotating said member an angular increment from one position to at least one other position, a first operating shaft, means coupling the first operating shaft to the rotating means, means including a resilient element for detenting the rotating means when the rotatable member is in each said position, said resilient element being adapted to be stressed by movement of the first operating shaft to such an extent than when released it will actuate the rotating means independently of the first operating shaft, a second operating shaft, a rotatable clutch driving member, means operably coupling the rotatable clutch driving member to the second operating shaft, a rotatable clutch drive member coupled to the rotating means and having a plurality of depressions in one of its surfaces by means of which it is to be rotated, said depressions being equally angularly spaced from each other about the axis of the rotatable clutch driven member a distance corresponding to said angular increment, a plurality of movable driving elements carried by the clutch driving member each drivingly engaged in one of said depressions, and means yieldably urging the driving elements into the respective depressions.

References Cited by the Examiner

UNITED STATES PATENTS

| | | | |
|---|---|---|---|
| 715,975 | 12/1902 | Carichoff. | |
| 865,486 | 9/1907 | Gannon | 64—29 |
| 2,598,448 | 5/1952 | Schultz | 74—112 |
| 2,631,444 | 3/1953 | Hollinger | 64—29 |
| 3,163,724 | 12/1964 | Roeser | 74—112 X |

MILTON KAUFMAN, *Primary Examiner.*